Oct. 9, 1928.
G. C. MAAG
1,686,827
AUTOMATIC COUPLING DEVICE FOR TRANSMISSION OF POWER
Filed March 22, 1924    4 Sheets-Sheet 1
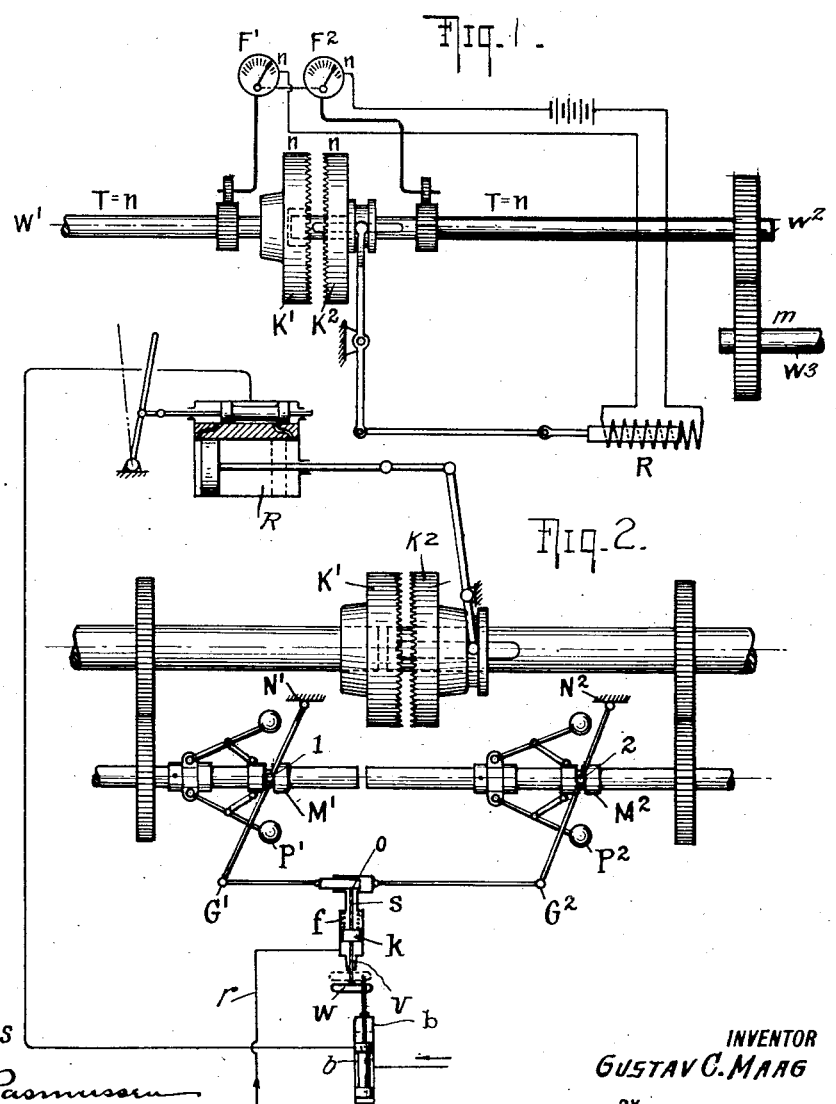
WITNESS
INVENTOR
GUSTAV C. MAAG
BY
ATTORNEYS Oct. 9, 1928.  1,686,827
G. C. MAAG
AUTOMATIC COUPLING DEVICE FOR TRANSMISSION OF POWER
Filed March 22, 1924    4 Sheets-Sheet 2
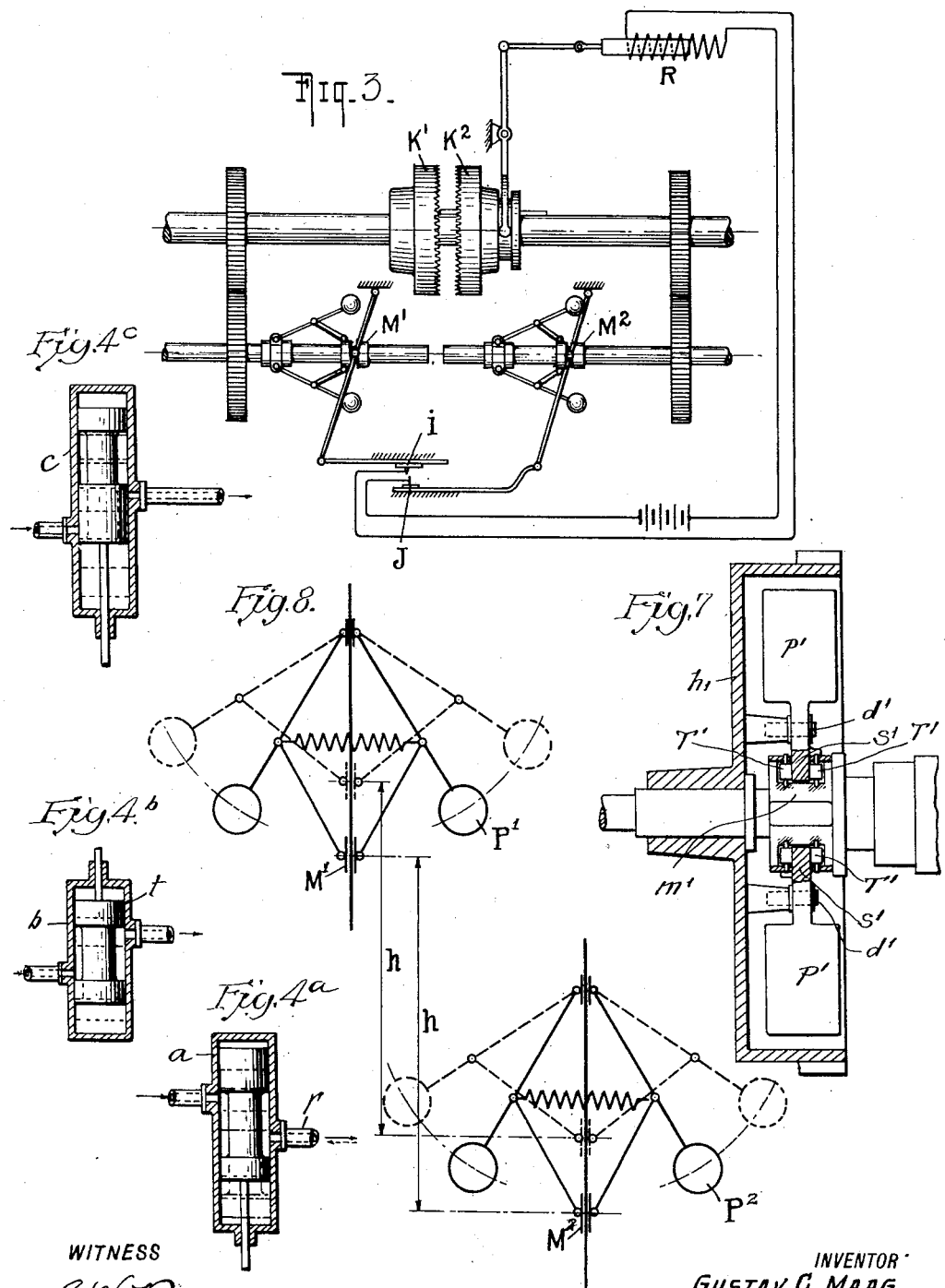
WITNESS
G. V. Rasmussen
INVENTOR
GUSTAV C. MAAG
BY
ATTORNEYS Oct. 9, 1928.  
G. C. MAAG  
1,686,827  
AUTOMATIC COUPLING DEVICE FOR TRANSMISSION OF POWER  
Filed March 22, 1924  4 Sheets-Sheet 3
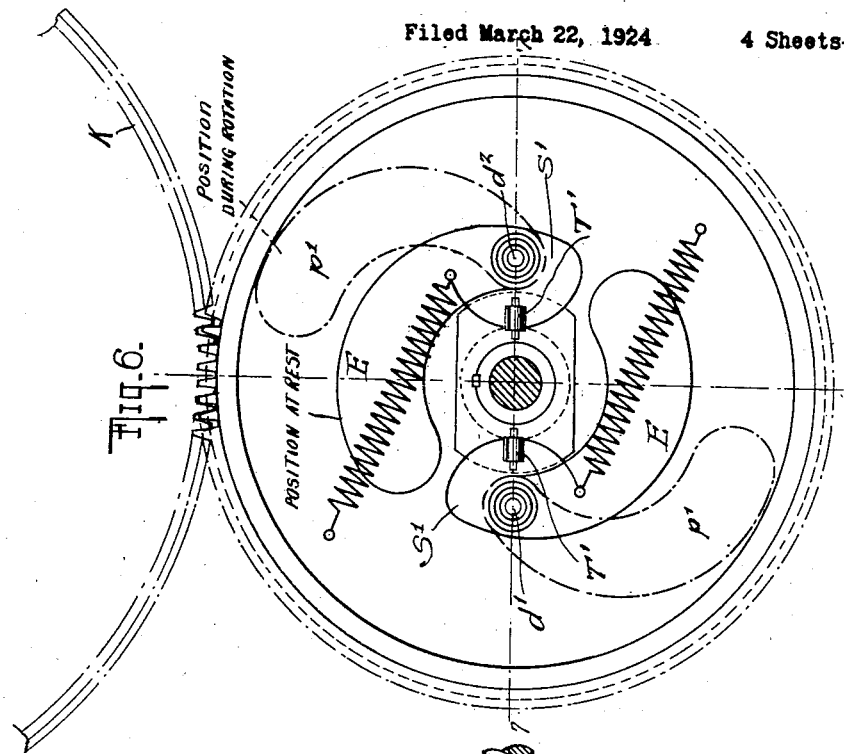
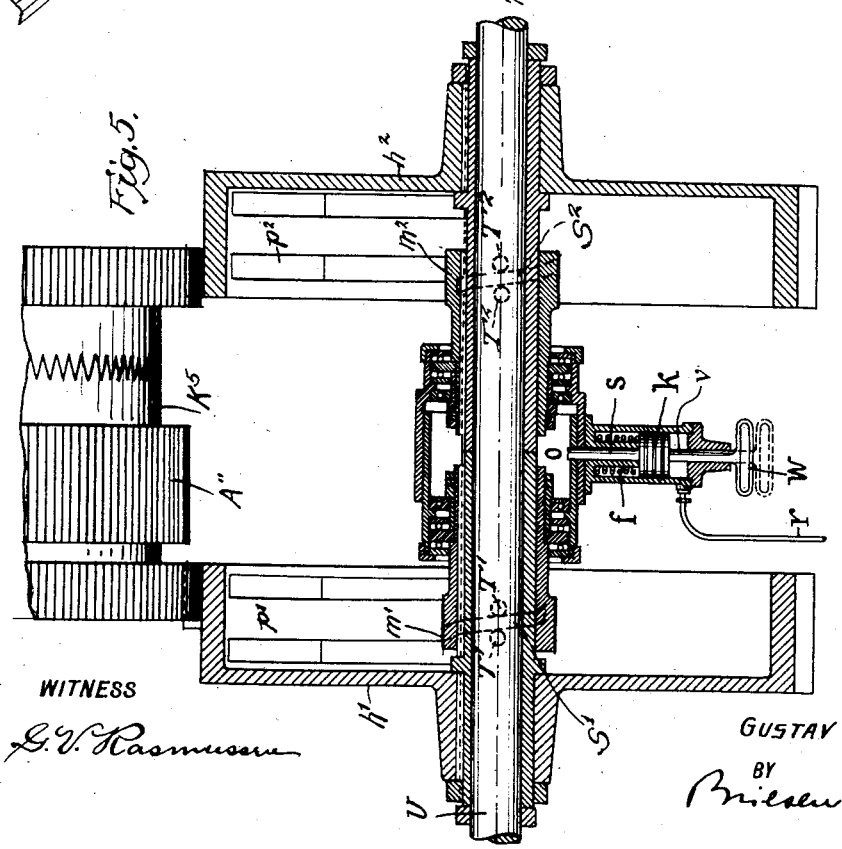
WITNESS  
G. V. Rasmussen
INVENTOR  
GUSTAV C. MAAG  
BY  
ATTORNEYS Oct. 9, 1928.
G. C. MAAG
1,686,827
AUTOMATIC COUPLING DEVICE FOR TRANSMISSION OF POWER
Filed March 22, 1924
4 Sheets-Sheet 4
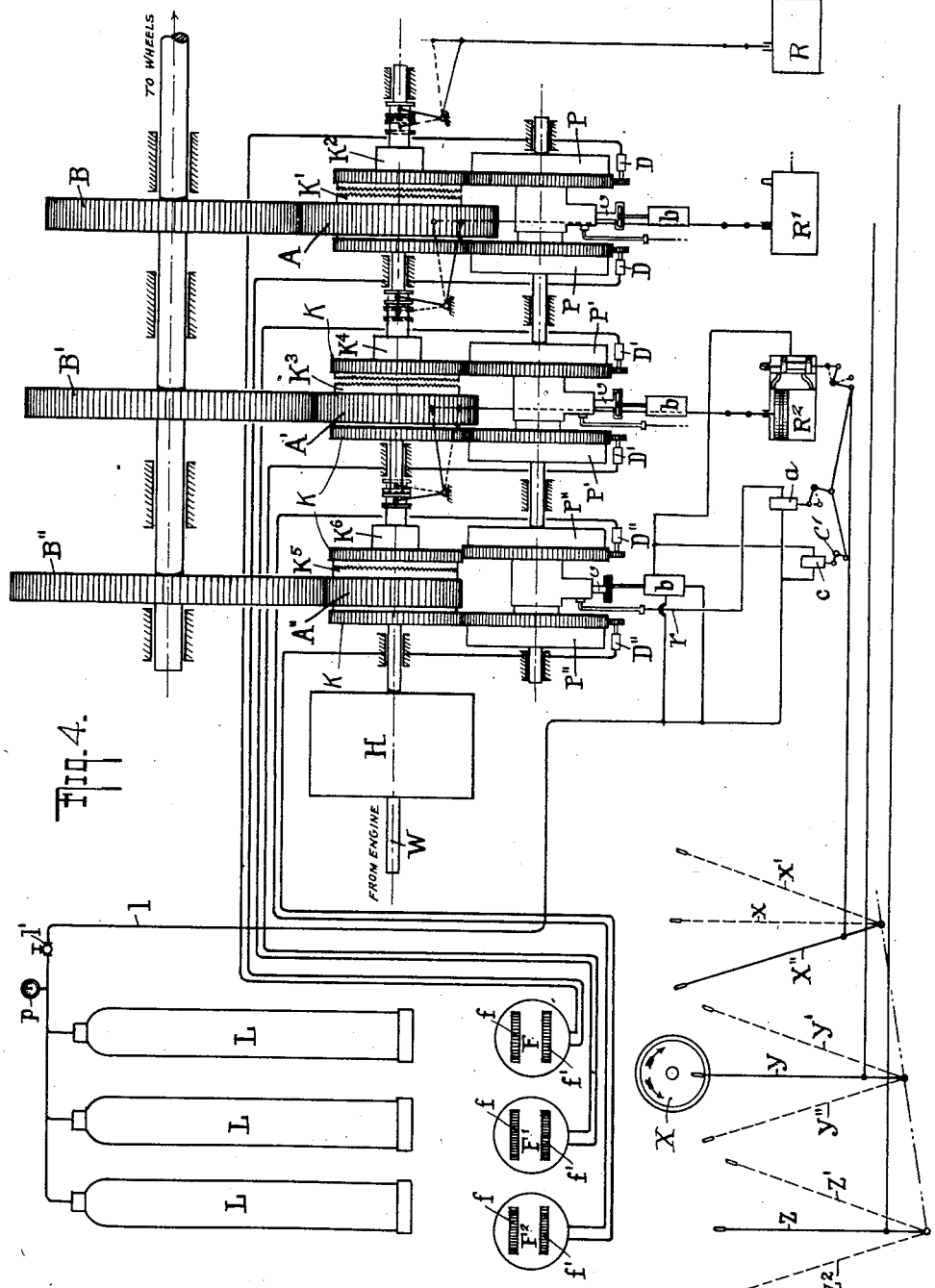
WITNESS
INVENTOR
GUSTAV C. MAAG
BY
ATTORNEYS Patented Oct. 9, 1928.

1,686,827

UNITED STATES PATENT OFFICE.

GUSTAV C. MAAG, OF DUISBURG, GERMANY.

AUTOMATIC COUPLING DEVICE FOR TRANSMISSION OF POWER.

Application filed March 22, 1924, Serial No. 701,166, and in Germany March 22, 1923.

This invention relates to automatic coupling devices particularly adapted for use with a plurality of rotatable power transmission or generating members, the respective members of which, when rotating at certain predetermined relative speeds, can be placed in operative power transmitting relationship without throwing unequal or other detrimental stress upon the rotating members, but which members can not be placed in operative condition, when rotating at speeds differing from said predetermined speeds, without subjecting them to detrimental stress.

The principal object of this invention is to provide a new and improved apparatus which will cause the rotating members of the device to which said apparatus is applied, to be placed automatically in operative condition when the proper synchronism of the speed of rotation of the power members is attained. These objects will be apparent to one skilled in the art to which this invention appertains from a reading of the following specification and by reference to the accompanying drawings forming a part hereof, and wherein various illustrative examples or applications of my invention are shown.

In the drawings, Fig. 1 is a diagrammatic illustration of an application of my invention in which a pair of tachometers are arranged in an electric circuit, which is employed for actuating a coupling clutch which connects a pair of rotating shafts.

Fig. 2 is an illustration of an apparatus in which a pair of centrifugal governors are substituted for the tachometers of Fig. 1 for actuating the clutch.

Fig. 3 is an installation similar to Fig. 2 in which centrifugal governors are used to actuate the switch of an electric circuit.

Fig. 4 is an illustration of an application of a plurality of centrifugally operated controls for use with the gears of a Diesel engine-operated locomotive.

Figs. 4$^a$, 4$^b$ and 4$^c$ are detail sections of the valves $a$, $b$ and $c$ respectively of Fig. 4.

Fig. 5 is a central longitudinal section through a pair of the centrifugal controls shown in Fig. 4.

Fig. 6 is a transverse cross section through one of the centrifugal controls shown in Fig. 5.

Fig. 7 is a section on the line 7—7 of Fig. 6.

Fig. 8 is a diagrammatic illustration of the principles of operation of the centrifugal governors shown in Figs. 2 and 3.

An apparatus constructed in accordance with the principles of my invention may be readily applied, for example, to two dynamos which, when running at the same or at a certain different predetermined speed ratio, are adapted to supply electric current for power or lighting purposes. The invention may also be used for actuating a coupling clutch for connecting two shafts, as shown in Figs. 1 to 3 inclusive. A further, more important application of the principles of the invention is found in its adaptation to the transmission gearings, such as used in locomotives which are driven by Diesel engines. In carrying out my invention, I may employ as shown in Fig. 1 a pair of tachometers suitably connected to and driven by the rotating members which are to be placed in operative position when the speed of rotation of said members reaches the proper predetermined ratio; the indicating mechanism of the tachometers completing a circuit at the proper predetermined point, which circuit will actuate a switch or other electrically operated device for causing the rotating members to be placed in operative relationship. Or, instead of employing tachometers any suitable speed responsive device, directly connected to the rotating members, as for example a pair of centrifugal governors, may be employed.

Fig. 1 shows an installation of the apparatus in which the tachometers F$^1$ and F$^2$ are employed to control the actuation of the clutch K$^1$, K$^2$. One half of the clutch K$^1$ is secured to a shaft W$^1$, the other half K$^2$ of said clutch being slidably but non-rotatably mounted upon the shaft W$^2$. The indicating mechanism of the tachometer F$^1$ is actuated by any suitable driving connection to the shaft W$^1$ and the indicating mechanism of the tachometer F$^2$ is actuated by a suitable mechanism from the shaft W$^2$. When the shafts W$^1$ and W$^2$ are rotating at the same speed, the indicating mechanism of the tachometers will complete a circuit leading to an electromagnet or solenoid R which will actuate clutch operating levers connected with the clutch half K$^2$ and will throw said clutch half into engagement with the clutch half K$^1$.

In Fig. 2 a pair of centrifugal governors are substituted for the tachometers shown in Fig. 1. The movable collar $M^2$ of the governor $P^2$ is pivotally connected to a link supported as at $N^2$, the connection being such that rotation of the collar $M^2$ is not interfered with; the aforesaid link is connected as by a knuckle joint $G^2$ with a slidable casing which contains a piston $k$ having a pin $s$ projecting therefrom, and which piston and pin are normally held retracted within said casing by means of a spring $f$. The movable collar $M^1$ of the centrifugal governor $P^1$ is pivotally connected as at 1 with a link pivotally supported as at $N'$; the pivotal connection 1, being likewise such as not to interfere with the rotation of the collar $M'$. Connected to the lower end of the latter link by a knuckle joint $G'$ is a horizontal arm, provided adjacent to its extreme end with an aperture $o$ in which the pin $s$ is adapted to be engaged when said aperture is brought into alignment with said pin. Compressed air from any suitable source is supplied through the pipe $r$ to operate the piston $k$ against the action of the spring $f$ and a suitable compressed air motor $R$ is connected by any suitable linkage with the clutch half $K^2$ for actuating the same into engagement with the clutch half $K^1$; the admission of air to the compressed air motor being controlled by the valve $b$ connected with the piston $k$ by means of a piston rod $v$ which projects downwardly from said piston and is provided with an elongated slot $w$ in which the stem of the valve $b$ engages. Fig. 8 shows diagrammatically the manner in which the apparatus shown in Fig. 2 operates. When the governors $P^1$, $P^2$, are rotating at the same speed, the distance $h$ between the collars $M^1$, $M^2$ remains constant and the aperture $o$ will be brought into alignment with the pin $s$. Piston $k$ will then be forced by the pressure of the compressed air entering through the pipe $r$ from any suitable source, as for example, a compressed air tank to cause the pin $s$ to enter the aperture $o$ thus actuating the valve $b$ to cause the compressed air motor to actuate the coupling half $K^2$ and cause the same to be engaged with the coupling half $K^1$.

In Fig. 3 a pair of centrifugal governors similar to those shown in Fig. 2 are employed but instead of operating the clutch half $K^2$ by means of a compressed air motor, an electromagnet or solenoid $R$ is employed. When the shafts upon which the clutch halves $K^1$, $K^2$ respectively are mounted, are rotating at the same speed, the contact points $i$, $j$, will be brought into engagement to complete the circuit to the electromagnet $R$ and thereby throw the clutch half $K^2$ into operative engagement with the clutch half $K^1$.

Fig. 4 shows an application of an automatic coupling device to a Diesel locomotive. Up to the present time considerable difficulty has been experienced in adapting Diesel engines to locomotive use, principally because of the difficulty in constructing a suitable transmission gearing adapted for the changing working conditions of the Diesel engine and the locomotive, as such a transmission gearing must permit changes of speed during motion of the locomotive even while it is transmitting great power. Consequently at the present time the Diesel engines have been used only with small units. As shown in Fig. 4, three different gear ratios, A—B, A'—B', A"—B", are employed. The reference character W indicates the shaft of a Diesel engine having a main coupling H interposed between it and the transmission gearing. The gears A, A', and A" are loose upon the main shaft which leads from the coupling H and are in mesh with the gears B, B' B", respectively, secured to a counter shaft which is operatively connected to the driving wheels of the locomotive. The gears A, A', A", have rigidly connected therewith the clutch members $K^1$, $K^3$, $K^5$ respectively, which clutch members are adapted to be engaged by the clutch members $K^2$, $K^4$, $K^6$, respectively. The clutch members $K^2$, $K^4$, $K^6$ are slidably but non-rotatably mounted upon the main shaft and are provided with a grooved collar in which a yoke is engaged for throwing the clutch members into operative engagement. Each of the loose gears A, A', A", and the clutch members $K^2$, $K^4$, $K^6$, has rigidly connected therewith a gear K which meshes with a gear formed on the periphery of a centrifugal releaser, there being a pair of such releasers (P, P', P") for each gear change A—B, A'—B', A"—B" and the members of each pair of releasers P, P', P" being connected by said gears K respectively to the clutch members K'—$K^2$, $K^3$—$K^4$, $K^5$—$K^6$. Thus the loose gears A, A', A" are rigidly connected with the clutch members K', $K^3$, $K^5$ respectively and the left hand gears K, while the clutch members $K^2$, $K^4$, $K^6$ are rigidly connected with the right hand gears K, consequently each member of each pair of releasers rotate in synchronism with its respective clutch half. Each of the releasers P, P', P" has geared thereto a small dynamo D, D', D", respectively. The dynamos D are connected with the scales $f$, $f'$ of a tachometer F, the dynamos D' with the scales of a tachometer F' and the dynamos D" with the scales of a tachometer $F^2$. The dynamos D, D', D", therefore, are each a part of the respective speed indicators, F, F', $F^2$, and the alternating currents produced by the rotation of these dynamos actuate the speed indicators to cause them to record the relative speeds of rotation of the dynamos and the clutch members geared therewith. The principal function of the speed indicators is to show the actual speed and to indicate which of the several couplings is in operation.

As shown in Figs. 5 and 6 each centrifugal releaser consists of a spur wheel casing, the teeth of which are in mesh with the gears K which drive the releasers in synchronism with their respective gears A, A', A'', and clutch members $K^2$, $K^4$, $K^6$. In Figs. 5 and 6 the spur wheel casings $h^1$, $h^2$ are shown as provided with the pivotally mounted weights $p^1$, $p^2$ respectively, which correspond in function with the weights $P^1$, $P^2$ of Fig. 2. The weights $p^1$, $p^2$ are pivoted at $d^1$, $d^2$, and are normally held by the springs E inwardly towards the axis of rotation of the casings as shown in full lines in Fig. 6. The inner ends of the weights are formed to provide the cam segments $S^1$, $S^2$ which are received between the roller bearings $T^1$, $T^2$ secured within the collars $m^1$, $m^2$ respectively. Rotation of the releasers will tend to cause the weights $p^1$, $p^2$, to move outwardly against the action of the springs E, E towards the dotted line position shown in Fig. 6, and thus move the collars $m^1$, $m^2$ longitudinally of the shaft U according to the curvature and pitch of the cam segments. The collar $m^1$ is connected to a casing provided with a small aperture $o$. The collar $m^2$ is connected with a casing having a cylinder depending therefrom, a piston $k$ mounted within said cylinder being provided with a pin $s$, and a rod $v$. The pin $s$ is adapted to be projected through said casing to engage with the aperture $o$, and a spring $f$ is provided for normally holding said piston and pin in a retracted position.

The construction and operation of the releasers and associated parts correspond with the construction illustrated in Figs. 2 and 8; the cam segments $S^1$, $S^2$ being of equal, but opposite, curvature so that the collars $m^1$, $m^2$ when synchronism occurs, move in the same direction in such a manner that the distance $h$, as illustrated in Fig. 8, between the collars remains constant.

A plurality of air compressors L are connected by means of the pipe line $l$ with the compressed air motors R, $R^1$, $R^2$; a pressure gauge $p$ and a valve $l'$ being interposed in said compressed air line. The plurality of control handles $x$, $y$, $z$, are provided for actuating the valves of the compressed air motors $R^2$, $R^1$, and R respectively. The piston $k$ is provided with a piston rod $v$ having an elongated slot $w$ in the lower widened end thereof, which engages with the stem of a valve $t$ mounted within the valve casing $b$, said valve casing being interposed in the supply line leading to the compressed air motor. A similar valve $b$ is provided for each set of releasers and gears, and a hand wheel X is arranged to regulate the admission of fuel to the Diesel engine. A valve $a$ governs the admission of compressed air from the tanks L to the piston $k$ and a valve $c$ releases the pressure of the air within the line leading to the air motor $R^2$. The operating lever $x$ is connected by a suitable system of links and levers with the valves $a$ and $c$ and the valve for the air motor $R^2$, while the operating levers $y$ and $z$ are provided with similar links and levers for operating the valves for the air motors $R^1$, R.

The operation of the apparatus shown in Fig. 4 is as follows: Assuming that the Diesel engine is rotating, with all clutches disengaged, all of the releasers will therefore be at rest, their speeds being zero, all speeds will be equal and the releasers will be in a state of synchronism the operating lever $x$ is thrown to the position $x''$, thus causing the valve of the air motor $R^2$ to be moved downwardly to admit air to the lower portion of said air motor, the valve $a$ being opened simultaneously by this movement of the lever and valve $c$ being closed. The air from the compressors L will enter the valve $b$ which at this time is closed to prevent the passage of the air to the air motor $R^2$. A portion of the air from the compressors will pass through the valve $a$ for delivery by the pipe line $r$ to the piston $k$, to force the piston upwardly against the action of spring $f$; if at this stage due to the state of synchronism the aperture $o$ is in alignment with the pin $s$, the latter and the piston $k$ will be permitted to move upwardly, this upward movement of the piston however being permitted only when each of the releasers P'', P'' are at rest, or rotating at equal speeds, which in the latter case, because of the gear ratios, represents a definite predetermined speed relationship differing from unity between the shafts to be coupled, said shafts being the shaft leading from the coupling H and the shaft upon which the gear wheels B, B' and B'' are mounted. The upward movement of the piston $k$ causes the valve $t$ within the valve casing $b$ to be moved upwardly by reason of the connection of the piston rod $v$ with the valve stem, and causes the valve $t$ to be opened to permit the air from the air tanks L to flow into the air motor $R^2$. The air flowing into the lower portion of the air motor $R^2$ will move its piston upwardly and through the linkage connected with the clutch half $K^6$ will cause said clutch to be thrown in operative engagement with the clutch half $K^5$. The locomotive is then started by gradually placing the main coupling H in driving relationship.

If it is desired to shift the gears when the locomotive is in motion, for example from first gear to second gear, the lever $x$, which as above described, was in position $x''$ will be moved by the operator to the position $x'$ thus causing the valve of air motor $R^2$ to be moved to its upper position to admit air to the upper side of the piston of the air motor and cause the clutch member K⁶ to be disengaged. Valve c, which is simultaneously shifted by the movement of the lever x to its opened position, permits the air from the compressed air tanks L to by-pass around the valve b, without passing through the latter, and to flow directly to the upper portion of the air motor R².

The operating lever y is then thrown to the position y'' thereby moving the valve for the motor R' to the lower position in which said valve is operative to permit the compressed air from the tanks L to flow to the cylinder of the motor R' below the piston thereof for actuating the clutch member K⁴ into engagement with the clutch member K³. As with the lever y in the position y'' the air flowing to the air motor R' must first pass through the valve b for said motor, the latter will not be actuated until the releasers P' P' are in synchronism, with the aperture o and pin s in alignment. Now as the gear A' with its clutch member K³ is being rotated by the idling engagement therewith of the gear B' and the clutch member K⁴ is being rotated by the engine, the speeds of rotation of the two clutch members will be different if the clutch lever y is thrown into the position y'', either too soon or too late. This however makes no difference, because, for the reasons set forth above, the air motor R' will not operate until the releasers P' P' are in synchronism. If the state of synchronism is not reached quickly so that the clutches are automatically engaged, the operator can immediately tell by glancing at the scales of tachometer F' whether it is necessary to increase or decrease the speed of the engine by the throttle X in order to bring the clutch members K³ K⁴ into synchronism.

In shifting from first to second gear, the levers x, y are shifted successively as above described. For shifting from second to third, the levers y, z would be operated in a similar manner while in shifting from third to second or from second to first, the levers z, y, and y, x respectively would be actuated in the order set forth to their positions z', y'' and y', x''. It will be understood readily that with an arrangement such as shown in Fig. 4 it will not be necessary to shift the gears progressively that is, for example, from first to second to third, but that the gear changes may be made selectively, as for example, from first to third gear without passing through second gear.

I claim:

1. In an apparatus of the character described, a pair of rotatable shafts, means including a clutch for connecting said shafts in operative driving relationship, a pair of centrifugal speed responsive devices, one for each of said shafts and operatively connected each with its respective shaft, means to actuate said clutch including means controlled by said speed responsive devices for permitting operation of the clutch actuating means only when said shafts are rotating in definite predetermined speed relationship.

2. In an apparatus of the character described, a pair of rotatable shafts, means including a clutch for connecting said shafts in operative driving relationship, means to actuate said clutch, a centrifugal speed responsive device operatively connected with each of said shafts, and control means operatively connected with said centrifugal speed responsive devices and said clutch actuating means for permitting said clutch actuating means to be operated only when said shafts are rotating synchronously.

3. In an apparatus of the character described, a pair of rotatable shafts, means including a clutch for connecting said shafts in operative driving relationship, means to actuate said clutch, a pair of centrifugal speed responsive devices, one for each of said shafts and each operatively connected with its respective shaft, and control means for governing the operation of said clutch actuating means, said control means including a pair of members movable relatively to each other and connected one with each of said speed responsive devices, said members being provided with parts movable into cooperating engagement by the action of said speed responsive devices, and said members and parts being so constructed and arranged with respect to said speed responsive devices that said parts will be brought into cooperating engagement for permitting engagement of said clutch only when a definite speed relationship exists between the shafts, but irrespective of the absolute speed of said shafts.

4. In an apparatus of the character described, a pair of rotatable shafts, means including a clutch for connecting said shafts in operative driving relationship, fluid pressure actuated means and connections therefrom to said clutch, a pair of centrifugal speed responsive devices, one for each of said shafts and each operatively connected with its respective shaft, a valve for controlling the operation of said fluid pressure means, and control means operatively connected with said valve and speed responsive devices to cause actuation of said valve, said fluid pressure means and said clutch when said shafts are rotating in definite predetermined speed relationship.

5. In an apparatus of the character described, a pair of rotatable shafts, means including a clutch for connecting said shafts in operative driving relationship, a fluid pressure actuated motor, and connections therefrom to said clutch, a pair of centrifugal speed responsive devices, one for each of said shafts and each operatively connected with its respective shaft, a valve for admitting fluid under pressure to said fluid pressure actuated means, a control device connected with said speed responsive devices constructed and arranged to be operative when said shafts and speed responsive devices are rotating in definite predetermined speed relationship, and connections from said control device to said valve.

6. In an apparatus of the character described, a pair of rotatable shafts, means including a clutch for connecting said shafts in operative driving relationship, a fluid pressure actuated motor, and connections therefrom to said clutch, a pair of centrifugal speed responsive devices, one for each of said shafts and each operatively connected with its respective shaft, a valve for admitting fluid under pressure to said fluid pressure actuated motor, a control device comprising a pair of relatively movable members one for each speed responsive device, and operatively connected therewith, said members being provided with parts adapted to be brought into cooperating relationship when said shafts are rotating in definite predetermined speed relationship and means connecting said control device to said valve to cause said valve to be opened when said parts are brought into said cooperating relationship.

7. In an apparatus of the character described, a pair of rotatable shafts, means including a clutch for connecting said shafts in operative driving relationship, a fluid pressure actuated motor, and connections therefrom to said clutch, a pair of centrifugal speed responsive devices, one for each of said shafts and each operatively connected with its respective shaft, a valve for admitting fluid under pressure to said fluid pressure actuated motor, means for holding said valve normally in closed position, a control device consisting of a pair of relatively movable members operatively connected with said speed responsive devices, cooperating parts mounted on said members adapted to be brought into operative positions by said speed responsive devices when said shafts are rotating in definite predetermined speed relationship, and a pressure responsive member connected with said parts and said valve to actuate said parts and valve when said parts are brought into said operative positions.

8. In an apparatus of the character described, a pair of rotatable shafts, means including a clutch for connecting said shafts in operative driving relationship, a fluid pressure actuated motor, and connections therefrom to said clutch, a pair of centrifugal speed responsive devices, one for each of said shafts and each operatively connected with its respective shaft, a valve for admitting fluid under pressure to said fluid pressure actuated motor, means for holding said valve normally in closed position, a control device consisting of a pair of relatively movable members operatively connected with said speed responsive devices, cooperating parts mounted on said members adapted to be brought into operative positions by said speed responsive devices when said shafts are rotating in definite predetermined speed relationship, a pressure responsive member connected with said parts and said valve to actuate said parts and valve when said parts are brought into said operative positions, a lever, and devices controlled thereby to cause said motor to be operated in reverse directions.

In testimony whereof I have hereunto set my hand.

GUSTAV C. MAAG